US012698983B2

(12) United States Patent
Wiese et al.

(10) Patent No.: US 12,698,983 B2
(45) Date of Patent: Aug. 4, 2026

(54) METHOD AND CIRCUIT ARRANGEMENT FOR DETERMINING AN INDUCTANCE OF A MEASURING COIL

(71) Applicant: Vitesco Technologies GmbH, Regensburg (DE)

(72) Inventors: Peter Wiese, Kelkheim (DE); Stefan Köhler, Frankfurt (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 154 days.

(21) Appl. No.: 18/839,567

(22) PCT Filed: Jan. 30, 2023

(86) PCT No.: PCT/EP2023/052157
§ 371 (c)(1),
(2) Date: Aug. 19, 2024

(87) PCT Pub. No.: WO2023/160950
PCT Pub. Date: Aug. 31, 2023

(65) Prior Publication Data
US 2025/0155264 A1      May 15, 2025

(30) Foreign Application Priority Data
Feb. 24, 2022    (DE) ..................... 10 2022 201 923.7

(51) Int. Cl.
*G01D 5/20*        (2006.01)
*G01B 7/30*        (2006.01)

(52) U.S. Cl.
CPC ................. *G01D 5/20* (2013.01); *G01B 7/30* (2013.01)

(58) Field of Classification Search
None
See application file for complete search history.

(56) References Cited

U.S. PATENT DOCUMENTS

| | | | |
|---|---|---|---|
| 5,043,661 A | 8/1991 | Dubey | |
| 5,332,966 A * | 7/1994 | Berberich | ................ G01D 5/20 |
| | | | 324/656 |
| 2019/0094046 A1 | 3/2019 | Hasegawa | |

FOREIGN PATENT DOCUMENTS

| | | |
|---|---|---|
| DE | 4120861 A1 | 1/1993 |
| DE | 4142680 A1 | 7/1993 |

(Continued)

OTHER PUBLICATIONS

Search Report for International Application No. PCT/EP2023/052157, 12 pages, Dec. 4, 2023.

(Continued)

*Primary Examiner* — Noam Reisner
(74) *Attorney, Agent, or Firm* — Slayden Grubert Beard PLLC

(57)        ABSTRACT

An example includes: switching on and off a coil current at switch-on times and switch-off times specified by means of a clock signal; generating a PWM signal with a duty cycle representative of the inductance of the measuring coil with rising and falling PWM signal edges, triggered at the same time as the switching on or switching off of the coil current and triggered as soon as a value of the coil current reaches a specified trigger threshold, or both of which are triggered as soon as a value of the coil current reaches a specified trigger threshold; evaluating the PWM signal to determine the duty cycle and the inductance; detecting a steady-state maximum value of the coil current after switching on and before subsequently switching off the coil current; and specifying the trigger threshold depending on the detected steady-state maximum value of the coil current.

9 Claims, 4 Drawing Sheets

(56) References Cited

FOREIGN PATENT DOCUMENTS

| DE | 4304060 | A1 | 8/1994 |
|----|---------|----|--------|
| DE | 4304061 | A1 | 8/1994 |
| DE | 102011014330 | A1 | 9/2012 |
| DE | 1020111014330 | | 9/2012 |
| DE | 102014216609 | A1 | 2/2016 |
| EP | 0548495 | B1 | 10/1992 |
| WO | WO-2008101996 | A1 * | 8/2008 ......... G01R 27/2611 |

OTHER PUBLICATIONS

Search Report for DE Application No. 10 2022 201 923.7, 9 pages, Jan. 20, 2023.

Wikipedia / Halb-Differenzial-Kurzschlussringgeber / May 25, 2018.

* cited by examiner

METHOD AND CIRCUIT ARRANGEMENT FOR DETERMINING AN INDUCTANCE OF A MEASURING COIL

CROSS-REFERENCE TO RELATED APPLICATIONS

This application is a U.S. National Stage Application of International Application No. PCT/EP2023/052157 filed Jan. 30, 2023, which designates the United States of America, and claims priority to DE Application No. 10 2022 201 923.7 filed Feb. 24, 2022, the contents of which are hereby incorporated by reference in their entirety.

TECHNICAL FIELD

The present disclosure relates to measuring systems. Various embodiments include methods and/or systems such as a circuit arrangement for determining an inductance of a measuring coil.

BACKGROUND

Circuit arrangements exist in a wide range of designs, for example for determining the inductance of a measuring coil of a position sensor or an angle sensor. In most cases, the determination of inductance is based on the fact that the measuring coil is integrated as an electrical component in a tilt circuit (for example monoflop) or an oscillating circuit in such a way that the inductance thereof defines a time constant or pulse duration or frequency of a signal generated by the circuit. The inductance can be determined by means of a suitable evaluation of this measurement signal.

Especially in the case of a measuring coil made of metallic material (for example copper material), the problem arises that the measuring signal or, for example, a time constant determined therefrom, depends not only on the inductance but also on an ohmic resistance component of the impedance of the measuring coil and this resistance component is often strongly dependent on temperature. The temperature dependency of the resistance value leads to corresponding measurement errors in the determination of the inductance when the method is used in environments with fluctuating temperature.

DE 41 20 861 C2 discloses a travel range measuring device for measuring two angles, where the inductance of a respective measuring coil is determined for each of these angle measurements. In order to avoid a temperature dependency of the determination result (temperature compensation) in this case, this well-known measuring device also includes a reference coil and a ratio between the inductances of the two coils exposed to the same environmental influences (measuring coil and reference coil) is determined.

DE 43 04 061 B4 discloses a circuit arrangement for evaluating measuring reactances, in which a reference coil exposed to the same environmental influences is also used for a temperature-compensated determination of an inductance of a measuring coil.

Disadvantageously, however, a reference coil takes up additional installation space, generates additional weight, and requires additional electrical lines and contacting systems. In addition, higher costs are incurred. With regard to the temperature drift of the ohmic resistance component of the measuring coil that is to be compensated, it is also the case that, due to manufacturing variations, a reference coil does not usually have the exact same resistance value or the same temperature drift as the actual measuring coil, which may lead to measurement errors.

Another approach to solving the problem of temperature compensation is to detect the temperature of the measuring coil using a separate temperature sensor and to correct a measured inductance based on the detected temperature. In addition to the associated additional costs, temperature detection by means of a temperature sensor raises the issue, for example, of ensuring sufficient synchronization between the temperature measured by the sensor and the temperature of the measuring coil in the event of rapid temperature changes. Since this is often only insufficiently successful in practice, this type of temperature compensation also entails measurement errors.

SUMMARY

The teachings of the present disclosure include methods and/or systems by which a temperature-compensated determination of the inductance of a measuring coil is made possible while avoiding the disadvantages of the prior art explained above. For example, some embodiments include a method for determining an inductance (L) of a measuring coil (2), comprising: switching on and switching off a coil current (I) flowing through the measuring coil (2) at switch-on times and switch-off times that are specified by means of a clock signal (V3), generating a PWM signal (out) with a duty cycle that is representative of the inductance (L) of the measuring coil (2) by generating the PWM signal (out) with rising and falling PWM signal edges, which on the one hand are triggered at the same time as the switching on or switching off of the coil current (I) and on the other hand are triggered as soon as a value of the coil current (I) reaches a specified trigger threshold (TRG), or both of which are triggered as soon as a value of the coil current (I) reaches a specified trigger threshold (TRG), evaluating the PWM signal (out) in order to determine the duty cycle thereof and from this the inductance (L) of the measuring coil (2), wherein, for compensation of a temperature dependency of the duty cycle of the PWM signal (out) due to a temperature dependency of an ohmic resistance (R) of the measuring coil (2), the method further comprises: detecting a steady-state maximum value (Imax) of the coil current (I) after switching on and before subsequently switching off the coil current (I), and specifying the trigger threshold (TRG) depending on the detected steady-state maximum value (Imax) of the coil current (I).

In some embodiments, compensating for the temperature dependency of the duty cycle is carried out after each time the coil current (I) is switched on.

In some embodiments, the steps to compensate for the temperature dependency of the duty cycle are carried out after each nth time the coil current (I) is switched on, where n is an integer for example in the range of 2 to 100.

In some embodiments, the execution of the steps to compensate for the temperature dependency of the duty cycle is commanded by a control signal as required.

In some embodiments, the measuring coil (2) is formed by a winding made of metallic material or by a conductor track made of metallic material on a circuit carrier board.

In some embodiments, the coil current (I) is conducted via a measuring resistor (R5, R6) arranged in series with the measuring coil (2) and the detection of the value of the coil current (I) is realized by detecting a voltage (U1) dropping across the measuring resistor (R5, R6).

As another example, some embodiments include a circuit arrangement (1) for determining an inductance (L) of a measuring coil (2), comprising: a current feed device (10) for switching on and switching off a coil current (I) flowing through the measuring coil (2) at switch-on times and switch-off times that are predefined by means of a clock signal (V3), a PWM signal generating device (20) for generating a PWM signal (out) with a duty cycle that is representative of the inductance (L) of the measuring coil (2) by generating the PWM signal (out) with rising and falling PWM signal edges, which on the one hand are triggered at the same time as the switching on or switching off of the coil current (I) and on the other hand are triggered as soon as a value of the coil current (I) reaches a specified trigger threshold (TRG), or both are triggered as soon as a value of the coil current (I) reaches a specified trigger threshold (TRG), having a trigger specification device (22) for specifying the trigger threshold (TRG), a detection and comparison device (24) for measuring a value of the coil current (I) and for comparing this value with the specified trigger threshold (TRG), an evaluating device (30) for evaluating the PWM signal (out) in order to determine the duty cycle thereof and from this the inductance (L) of the measuring coil (2), wherein, for compensation of a temperature dependency of the duty cycle of the PWM signal (out) due to a temperature dependency of an ohmic resistance (R) of the measuring coil (2), the PWM signal generating device (20) further comprises a detection and specification update device (26) for detecting a steady-state maximum value (Imax) of the coil current (I) after switching on and before subsequently switching off the coil current (I) and for specifying the trigger threshold (TRG) depending on the detected steady-state maximum value (Imax) of the coil current (I).

In some embodiments, the detection and comparison device (24) comprises: a measuring resistor (R5, R6) arranged in series with the measuring coil (2) when determining the inductance (L) of the measuring coil (2) and via which the coil current (I) is conducted, and a comparator (V1) for comparing a voltage (U1) dropping across the measuring resistor (R5, R6) with a trigger threshold (TRG) specified as trigger voltage (VTRG).

As another example, the detection and specification update device (26) comprises a sample-and-hold circuit (SH) for sampling and holding a voltage (U2) dropping across the measuring resistor (R5, R6).

As another example, some embodiments include the use of a method as described herein and/or a circuit arrangement (1) as described herein for determining an inductance (L) of a measuring coil (2) of an inductive sensor, in particular a position sensor or an angle sensor.

BRIEF DESCRIPTION OF THE DRAWINGS

The teachings of the present disclosure are described in more detail below with the aid of exemplary embodiments with reference to the appended drawings, in which.

DETAILED DESCRIPTION

Figure 1:
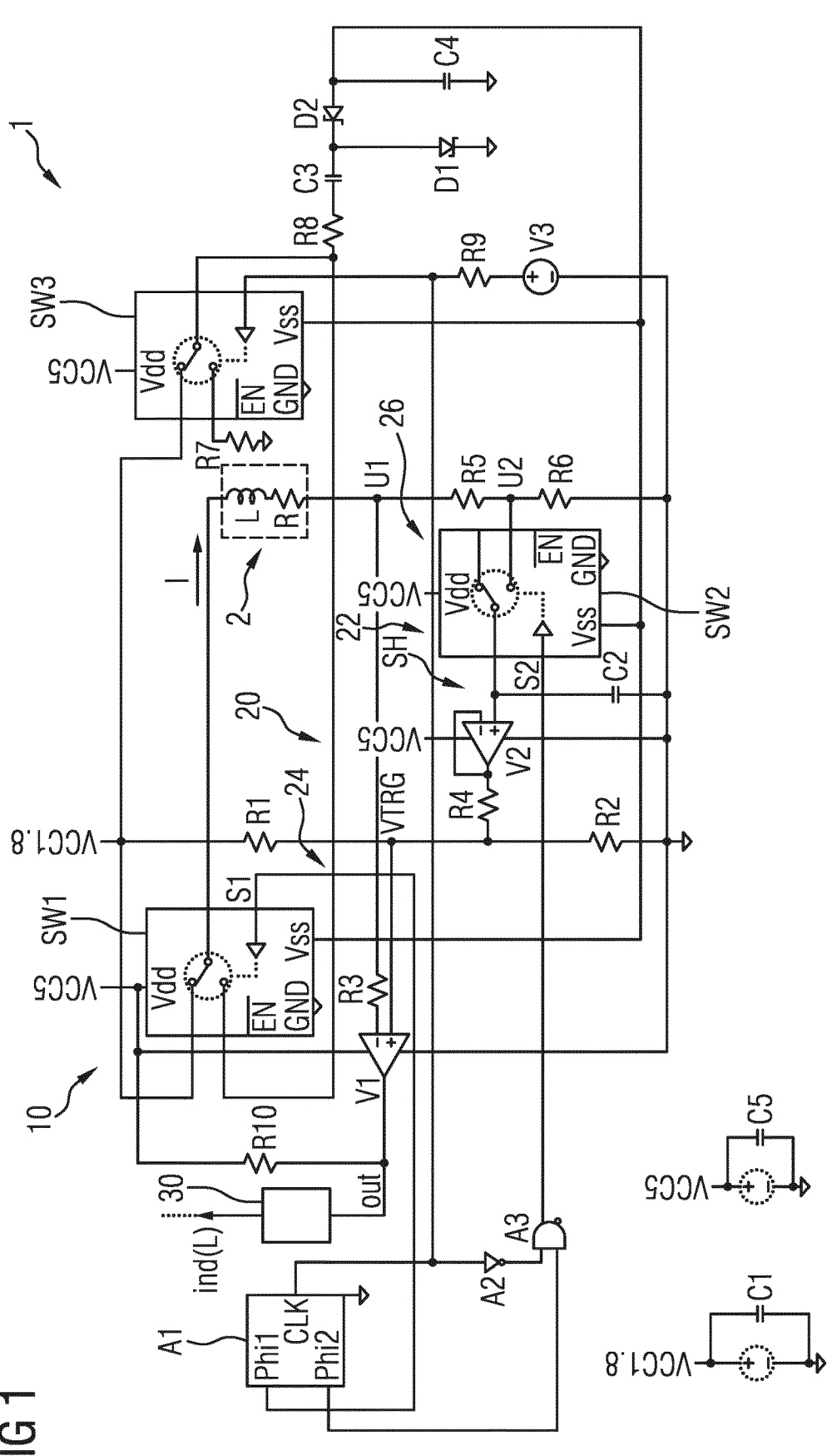
FIG. 1 shows a circuit arrangement for determining an inductance of a measuring coil incorporating teachings of the present disclosure.

In some embodiments, there is a method for determining an inductance of a measuring coil, comprising: switching on and switching off a coil current flowing through the measuring coil at switch-on times and switch-off times that are specified by means of a clock signal, generating a PWM signal with a duty cycle that is representative of the inductance of the measuring coil by generating the PWM signal with rising and falling PWM signal edges, which on the one hand are triggered at the same time as the switching on or switching off of the coil current and on the other hand are triggered as soon as a value of the coil current reaches a specified trigger threshold, or both of which are triggered as soon as a value of the coil current reaches a specified trigger threshold, evaluating the PWM signal in order to determine the duty cycle thereof and from this the inductance of the measuring coil, wherein, for compensation of a temperature dependency of the duty cycle of the PWM signal due to a temperature dependency of an ohmic resistance of the measuring coil, the method further comprises: detecting a stationary maximum value of the coil current after switching on and before the subsequent switching off the coil current, and specifying the trigger threshold depending on the detected stationary maximum value of the coil current.

Some embodiments utilize a temperature dependency of the ohmic resistance component of the measuring coil in order to use the measuring coil itself as a temperature sensor, so to speak. The way of determining inductance and the achievement of temperature compensation are in this case may be synergistically linked to one another. The teachings may be used to eliminate the need for an additional reference coil as well as an additional temperature sensor. Therefore, this can save on installation space and weight. In addition, there may be an advantageous simplification with regard to the electrical lines and contacting systems between the measuring coil and a circuit arrangement intended for determining the inductance, which is significant for many applications.

Such a circuit arrangement may be contained, for example, in a separate control device (for example control unit), that is to say located away from the measuring coil and in this case may be "wired" to the measuring coil, for example. In some embodiments, such a control device or circuit arrangement can be combined structurally with the measuring coil, for example arranged together with the measuring coil on a common circuit carrier board.

The above-mentioned generation of a PWM signal with a duty cycle that is representative of the inductance of the measuring coil is essential for the determination of the inductance. Suitable evaluation of the PWM signal or the duty cycle thereof thus enables the inductance of the measuring coil to be determined.

In some embodiments, the evaluation of the PWM signal includes low-pass filtering in order to obtain a signal (for example a voltage signal) that is representative of the duty cycle and thus the inductance. If desired, the latter signal can be subjected for example to analog-to-digital conversion (and possibly digital further processing) in order to also obtain a digital signal (data signal) that is representative of the inductance (or a measured variable in the case of an inductive sensor) as an alternative or in addition to an analog signal as a result of the evaluation.

In some embodiments, the PWM signal is evaluated using digital signal processing. For example, the durations of pulses and/or pauses of the PWM signal that are relevant for the determination of inductance can be "counted" (cf. for example DE 41 20 861 C2) in order to determine the duty cycle and thus the inductance of the measuring coil. Based on the result of such a digital count, a digital signal (data signal) that is representative of the inductance (or measured variable of a sensor) can then be generated on a digital level.

The PWM signal could also be subjected to an analog-to-digital conversion for the purpose of digital evaluation, for example as such, in order to subsequently determine the duty cycle and thus the inductance or measured variable of the sensor using digital signal processing.

Provision may be made, for example, to carry out the digital steps of the evaluation by means of a program-controlled computer device, for example in a microcontroller or the like. In some embodiments, for example the use of an application-specific integrated circuit (ASIC) or the like can also be considered in the context of the evaluation. The clock signal may constitute in particular a periodic square-wave signal, for example.

For "switching on" and "switching off" the coil current feed, provision may be made for a predetermined voltage (for example a supply voltage of the circuit arrangement used) and a voltage of zero to be applied in alternation to the measuring coil or to a current path containing the measuring coil. In some embodiments, for "switching on" and "switching off" the coil current feed, provision may be made for a predetermined first voltage and a different predetermined second voltage to be applied in alternation to the measuring coil or the current path, both of which are not equal to zero.

The switch-on times and switch-off times of the coil current feed can be provided at the same time as clock signal edges, for example, for which the respective switching processes can be triggered, for example by respective clock signal edges. The frequency of the clock signal may in this case correspond to the frequency of the switch-on processes (or switch-off processes) of the coil current feed, or else represent it as a multiple thereof, for example, whereby in the latter case the switch-on processes (or switch-off processes) can then be triggered by the edges of a correspondingly frequency-divided version of the clock signal.

The PWM signal can be generated, for example, with PWM signal edges, which on the one hand (for example rising or falling PWM signal edges) are triggered at the same time as the coil current is switched on and on the other hand (for example falling or rising PWM signal edges) are triggered as soon as a value of the coil current that increases as a result of the current feed being switched on exceeds a specified trigger threshold.

In some embodiments, the PWM signal can be generated, for example, with PWM signal edges, which on the one hand (for example rising or falling PWM signal edges) are triggered at the same time as the coil current is switched off and on the other hand (for example falling or rising PWM signal edges) are triggered as soon as a value of the coil current that decreases as a result of the current feed being switched off falls below a specified trigger threshold.

In some embodiments, the PWM signal can be generated, for example, with rising and falling PWM signal edges, which on the one hand (for example rising or falling PWM signal edges) are triggered as soon as a value of the coil current that increases as a result of the current feed being switched on exceeds a specified trigger threshold and on the other hand (for example falling and rising PWM signal edges) are triggered as soon as a value of the coil current that decreases as a result of the current feed being switched off falls below a specified trigger threshold.

In all three cases, the PWM signal can be generated with a constant period duration, but with a duty cycle that is dependent on the inductance of the measuring coil.

The increase in the value of the coil current after each time the coil current is switched on as well as the decrease in the value of the coil current after each time it is switched off usually follows an approximately exponential curve with a characteristic time constant that depends on the inductance and the ohmic resistance component of the measuring coil.

In the case of a "series resistor" connected in series with the measuring coil, which can also be used as a "measuring resistor" for the detection of the coil current, the exponential profiles mentioned and thus the characteristic time constants also depend on the value of this series resistor.

The use of such a series resistor may have the advantage, for example, that the exponential profiles mentioned (and thus the representation of the inductance by the PWM duty cycle) are less dependent on properties of the current source used (for example internal resistance of the current source).

Since the series resistor can easily be provided with a very small temperature coefficient compared to the temperature coefficient of the ohmic resistance component of the measuring coil, the compensation of the temperature dependency of the duty cycle of the PWM signal is usually completely sufficient in practice solely on the basis of a temperature dependency of the ohmic resistance of the measuring coil.

A steady-state maximum value of the coil current after switching on and before subsequently switching off the coil current is detected for the temperature compensation. On the basis of an exponential time profile, the maximum value of the current would theoretically only be reached after an infinite waiting time (after switching on). This detection is to be understood from a practical point of view in such a way that a waiting period is sufficient for this, after which the value of the coil current would change only insignificantly, in particular by less than 10%, for example. or by less than 5%, for example.

The trigger threshold is then specified accordingly depending on the previously detected maximum value of the coil current, that is to say for example in the event of a change in temperature of the measuring coil, in such a way that this at least partially compensates for the influence of the temperature change on the PWM duty cycle (temperature compensation).

Temperature compensation may reduce or completely eliminate the dependency of the PWM duty cycle on the temperature of the measuring coil. This is due to the fact that the mentioned maximum value of the coil current does not depend on the inductance, but only on the ohmic resistance of the measuring coil, which in turn depends only on the temperature of the measuring coil. The maximum value of the coil current or, for example, a signal (for example voltage drop across the measuring resistor after a sufficiently "long" switch-on duration of the current feed) representing this maximum value (or approximate value therefor) can thus advantageously be used as a measure of the temperature of the measuring coil.

Based on the corresponding measured variable, temperature compensation can be achieved by a suitable specification or tracking (updating) of the trigger threshold in the event of temperature changes.

In some embodiments, this is done analogously, for example by feeding a measuring voltage that is dependent on the measuring coil temperature via a resistor network to a reference input of a comparator whose output signal is used to trigger a corresponding PWM signal edge. As already mentioned, this measuring voltage in particular may be for example a voltage dropping across said series resistor, which in this respect can then also be described as a measuring resistor (for detecting the value of the coil current).

In some embodiments, it is possible, for example, to subject the temperature-dependent voltage mentioned to an analog-to-digital conversion, that is to say to detect it digitally, in order to then realize the temperature compensation by means of digital algorithms of software running on a digital data processing device (for example a microcontroller).

In some embodiments, the steps to compensate for the temperature dependency of the duty cycle to be carried out after each time the coil current is switched on. In this case, the reaction time of the temperature compensation is minimal, because after each "measurement cycle", which can be defined for example from one switch-on time to the next switch-on time, or for example from one switch-off time to the next switch-off time, the trigger threshold is respecified (updated) for the purpose of temperature compensation.

However, in contrast to some of the alternative embodiments described below, the PWM signal can be continuously generated in an "undisturbed" manner and can therefore be evaluated sufficiently accurately, in particular for example using simple low-pass filtering.

In some embodiments, the steps to compensate for the temperature dependency of the duty cycle to be carried out after each nth time the coil current is switched on, where "n" is an integer that may be for example in the range of 2 to 100. In this case, specific "temperature compensation cycles" may be provided in particular, in which a time span between switching on and subsequently switching off the coil current is greater than in the case of "measurement cycles" for determining the inductance.

The longer time span can ensure here that the coil current reaches its steady-state maximum value at the end of the temperature compensation cycle or the accuracy of the detection of this steady-state maximum value of the coil current can be increased. In contrast, in the case of the measurement cycles (for inductance determination), such time spans between switching processes may also be shorter, since the coil current in this case does not have to reach the steady-state maximum value, but only the trigger threshold.

The trigger threshold may be operational, that is to say within a temperature range to be expected in the application situation, or for example for a certain reference temperature (for example room temperature), for example in a range of 5% to 95%, preferably 10% to 90%, of the steady-state maximum value of the coil current. In one embodiment, provision is made for the trigger threshold to be either well above 50% (for example at least 70%) or well below 50% (for example no more than 30%) of the steady-state maximum value of the coil current.

If the temperature compensation is carried out after every second time the coil current is switched on (n=2), there is usually again the advantage of a PWM signal that can be evaluated sufficiently accurately in a simple way, for example by means of low-pass filtering. If the temperature compensation is only activated after every third, fourth, fifth, etc. time the coil current is switched on (n>2), the correspondingly rather sporadically "interspersed" temperature compensation cycles can represent a certain interference of the PWM signal, which makes a correspondingly longer time constant appropriate in the case of an evaluation of the PWM signal by means of low-pass filtering (averaging over many cycles).

In this case (n>2), in order to achieve higher evaluation quality, a digital evaluation of the PWM signal may alternatively be appropriate, for example by counting the relevant time durations or by analog-to-digital conversion with subsequent evaluation by a digital data processing device.

In some embodiments, the execution of the steps to compensate for the temperature dependency of the duty cycle to be commanded by a control signal as required. In this case, a control device that outputs the control signal may be located for example separately from a circuit arrangement or control device by means of which the other steps of the impedance detection method are carried out.

In some embodiments, and especially of interest for example when determining an inductance of a measuring coil of a sensor (for example position sensor or angle sensor), a single (structurally combined) control device can also be provided for these embodiments, by means of which both the determination of the inductance, that is to say the actual sensor functionality, is carried out and the control signal for commanding a temperature compensation (for example a "temperature compensation cycle") is generated.

When using a method incorporating teachings of the present disclosure for the operation of a sensor (for example a position sensor or angle sensor), provision may be made for example of a control device on which the measuring coil is structurally arranged or connected (via an electrical line connection such as wiring, for example) and which, for example, generates said control signal only before each actual use of the sensor, and possibly also from time to time (for example periodically) during such a use.

Finally, with regard to the times at which the temperature compensation is carried out, In some embodiments, a control device used to carry out the methods described herein (with means for current feed, current detection, current value comparison with the trigger threshold, etc.) has a digital interface (for example a CAN interface or the like) via which a control signal can be supplied from an external source, for example via a digital communication bus (for example a CAN bus), said control signal being used to be able to set the control device to different operating modes, for example according to the embodiments explained above, with temperature compensation after each switch-on, after each nth switch-on, or as required.

In some embodiments, the measuring coil to be formed by a metallic material, that is to say for example by a winding made of metallic material or by a conductor track made of metallic material on a circuit carrier board. Furthermore, at least some of the electrical and/or electronic components of the circuit arrangement used to carry out the method according to the invention may be arranged in this case on said circuit carrier board. In particular, the metallic material of the measuring coil may be for example a copper material (copper or copper alloy).

The use of such material for the formation of the measuring coil is preferred in many areas of application, but usually entails a relatively large linear resistance-temperature coefficient. Technical copper has a linear resistance-temperature coefficient of about $4 \times 10\text{-}3$ K$-1$, which allows the ohmic resistance value of the measuring coil to vary by about 40% with temperature fluctuations between room temperature (25° C.) and 125° C. However, the temperature compensation achieved may advantageously eliminate an influence of even such large changes in resistance on the PWM signal that is representative of the inductance.

In this respect, the use of a method and/or a circuit arrangement of the type described here may be excellent for mobile applications, for example in a vehicle, for example to determine an inductance of a measuring coil of an inductive sensor arranged in a vehicle, such as a position sensor or an angle sensor, for example.

In some embodiments, the coil current to be conducted via a measuring resistor (as "series resistor") arranged in series with the measuring coil and for the detection of the value of the coil current to be realized by detecting a voltage dropping across the measuring resistor. The use of such a measuring resistor not only allows the simple generation of a voltage signal that is representative of the coil current (proportional to the coil current), but also has the advantages explained above with regard to such a series resistor.

The voltage dropping across a measuring resistor can be used both for detecting the value of the coil current for triggering the relevant PWM signal edges (as soon as the value of the coil current reaches the specified trigger threshold) and for detecting the steady-state maximum value of the coil current in the context of temperature compensation.

In some embodiments, there is a circuit arrangement for determining an inductance of a measuring coil, having: a current feed device for switching on and switching off a coil current flowing through the measuring coil at switch-on times and switch-off times that are predefined by means of a clock signal, a PWM signal generating device for generating a PWM signal with a duty cycle that is representative of the inductance of the measuring coil by generating the PWM signal with rising and falling PWM signal edges, which on the one hand are triggered at the same time as the switching on or switching off of the coil current and on the other hand are triggered as soon as a value of the coil current reaches a specified trigger threshold, or both are triggered as soon as a value of the coil current reaches a specified trigger threshold, having a trigger specification device for specifying the trigger threshold, a detection and comparison device for measuring a value of the coil current and for comparing this value with the specified trigger threshold, an evaluating device for evaluating the PWM signal in order to determine the duty cycle thereof and from this the inductance of the measuring coil, wherein, for compensation of a temperature dependency of the duty cycle of the PWM signal due to a temperature dependency of an ohmic resistance of the measuring coil, the PWM signal generating device further comprises: a detection and specification update device for detecting a steady-state maximum value of the coil current after switching on and before the subsequent switching off of the coil current and for specifying the trigger threshold depending on the detected steady-state maximum value of the coil current.

The embodiments described here for the methods incorporating teachings of the present disclosure and particular configurations can also be analogously provided individually or in any desired combination as embodiments or particular configurations of the circuit arrangement, and vice versa.

In some embodiments, the detection and comparison device comprises: a measuring resistor arranged in series with the measuring coil when determining the inductance of the measuring coil and via which the coil current is conducted, and a comparator for comparing a voltage dropping across the measuring resistor with a trigger threshold specified as trigger voltage.

In some embodiments, the detection and specification update device to comprise a sample-and-hold circuit for sampling and holding a voltage dropping across the measuring resistor.

Some embodiments include the use of a method and/or a circuit arrangement of the type described here for determining an inductance of a measuring coil of an inductive sensor.

The teachings herein may be of particular interest for mobile applications, for example in a vehicle. In such an application, in particular, the sensor may be for example a position sensor or angle sensor arranged in the vehicle and used to determine a position (for example an adjustment position) or an angle (for example an angle of adjustment) of a displaceable component of the vehicle based on the determined inductance. The component may be for example a throttle valve of an internal combustion engine of the vehicle or, for example, a body part such as a door or flap of the vehicle, for example.

Figure 2:
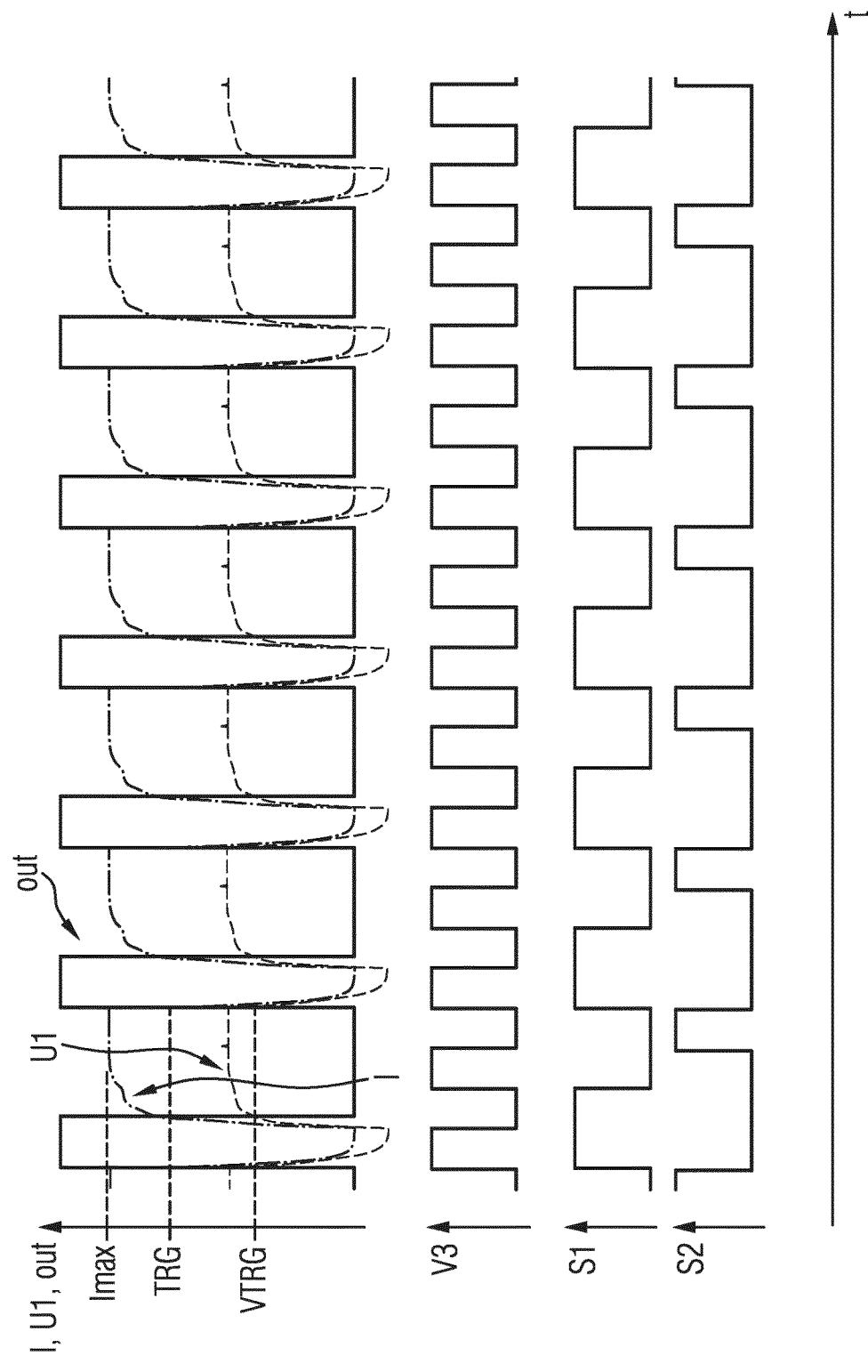
FIG. 2 shows exemplary time profiles of various current and voltage values during operation of the circuit arrangement of FIG. 1.

FIG. 1 shows a circuit arrangement 1 incorporating teachings of the present disclosure for determining an inductance L of a measuring coil 2. The measuring coil 2 is for example a measuring coil of an inductive sensor that is used for example to measure an adjustment position or for example an adjustment angle of a displaceable component in a vehicle. This is based on a certain dependency of the inductance L on such a position or such an angle. Before the circuit arrangement 1 shown in FIG. 1 is described in more detail, the steps of the method carried out using the circuit arrangement 1 are first described as follows, with reference to FIG. 2:

a) switching on and switching off a coil current I flowing through the measuring coil 2 at switch-on times and switch-off times that are specified by means of a clock signal V3 (in FIG. 2, the clock signal is plotted as a function of the time t).

In the example illustrated, the clock signal V3 is a periodic square-wave voltage signal (in the example 5V, 2 kHz, 50% duty cycle), wherein, as can be seen in FIG. 2, each third falling clock signal edge in the time profile defines a switch-on time of the current, and wherein the immediately preceding rising clock signal edges each define a switch-off time. In this example, the result is that periodic current feed cycles are clocked by a frequency-divided version of the clock signal used (in this case: V3) and that the switch-on time phases are longer than the switch-off time phases. In the example of FIG. 2, the frequency of the switch-on processes (or switch-off processes) corresponds to half of the frequency of the clock signal V3.

b) generating a PWM signal "out" with rising and falling PWM signal edges, which on the one hand (in FIG. 2 rising edges) are triggered as soon as a value of the coil current I that decreases as a result of the current feed being switched off falls below a specified trigger threshold "TRG", and on the other hand (in FIG. 2 falling edges) are triggered as soon as a value of the coil current I that increases as a result of the current feed being switched on exceeds the specified trigger threshold TRG.

A value of the coil current I increases in each switch-on phase of the current feed, whereas the value of the coil current I decreases again in each switch-off phase of the current, wherein in both phases the value of the coil current I corresponds in each case to an approximately exponential profile with a characteristic time constant (in this case for example: $L/(R5+R6)$). The trigger threshold TRG is expediently specified in a middle range of the exponential profile of the coil current I. Due to the dependency of the profiles of the coil current I or the time constants thereof on the inductance L of the measuring coil 2, the PWM signal out has a duty cycle that is representative of the inductance L.

c) evaluating the PWM signal out in order to determine the duty cycle thereof and from this the inductance L of the measuring coil 2 and for example providing same as a digital data signal "ind(L)", for example at a digital data bus of a vehicle.

In the example of FIGS. 1 and 2, a duty cycle of the PWM signal out, for example defined as the ratio of pulse duration to PWM period duration, increases as the inductance L increases and decreases as the inductance L decreases. Using this correlation, which for example is calculated in advance or empirically determined in advance, the inductance L of the measuring coil 2 can be determined by evaluating the PWM signal out.

However, it should be borne in mind that, if a temperature of the measuring coil 2 varies, for example due to a varying ambient temperature in a mobile application, a resistance R of the measuring coil 2 (that is to say an ohmic component of the impedance of the measuring coil 2) also varies when the measuring coil temperature varies, so that said duty cycle of the PWM signal out depends in practice not only on the inductance L but also on the temperature of the measuring coil 2.

Therefore, for compensation of a temperature dependency of the duty cycle of the PWM signal out (due to a temperature dependency of the ohmic resistance R of the measuring coil 2), the method further comprises the steps of:

d) detecting a steady-state maximum value "Imax" of the coil current I after switching on (but before subsequently switching off) the coil current I, and specifying (or updating) the trigger threshold TRG depending on the detected steady-state maximum value Imax of the coil current I.

This temperature compensation may achieve a situation in which an otherwise existing dependency of the duty cycle of the signal out on the temperature, as explained, is eliminated or at least reduced. In the example of the time profile shown in FIG. 2, it is assumed that neither the inductance L nor the temperature (and thus the resistance R) varies, and so the duty cycle of the PWM signal out does not change over time.

However, if for example the inductance L were to increase while the temperature remained constant, the duty cycle would increase and this increase in L would be determined on this basis during the evaluation (although the determined maximum value Imax of the coil current I would remain constant). If for example the temperature and thus the resistance R were to increase at constant inductance L, the determined maximum value Imax of the coil current I would decrease, whereupon the trigger threshold TRG is changed by temperature compensation depending on the detected value Imax in such a way that the duty cycle remains constant, and thus the constancy of the inductance L is correctly detected by the evaluation of the duty cycle.

With regard to the detection of the steady-state maximum value Imax of the coil current I after switch-on, it can be clearly seen in FIG. 2 that, after the expiry of the "waiting time" selected in the example corresponding to 1.5 periods of the clock signal V3, the value of the coil current I would change only insignificantly in the course of time t (in this case for example by less than 1%). The value Imax of the current I detected at the end of this waiting time therefore corresponds very exactly to the maximum current "Imax, theo" resulting on the basis of an exponential time profile with a time constant "tau"

$$I(t) = I\text{max, theo} \times \left(1 - \exp(-t/tau)\right)$$

theoretically only after an infinite waiting time. In the context of the disclosure, the detection may be carried out after a period of time of at least 2×tau, or at least 4×tau. The detected value Imax is thus a sufficiently good approximation value for the actual maximum current.

Returning to FIG. 1, the circuit arrangement 1 has a current feed device 10 by means of which the coil current I flowing through the measuring coil 2 can be switched on and switched off during operation of the circuit arrangement 1, wherein the corresponding switch-on times and switch-off times are specified using the clock signal V3. As can be seen from FIG. 1, further frequency-divided clock signals or drive signals S1 and S2 are formed from the clock signal V3, the time profile of the drive signals also being shown in FIG. 2.

The generation of the clock signal V3 is symbolized in FIG. 1 by a corresponding voltage source. Likewise, an electrical power supply of the circuit arrangement 1 using in the example two supply voltages VCC5 and VCC1.8 is symbolized in FIG. 1 by corresponding voltage sources.

As can be seen in FIG. 1, the current feed of the measuring coil 2 (coil current I) is switched on and switched off by means of an actuatable switching device SW1 (actuated by S1) and an actuatable switching device SW3 (actuated by V3), which connect a first terminal of the measuring coil 2 in alternation (at the corresponding switching times) either to the supply voltage VCC1.8 or via a resistor R7 to a ground potential GND.

A second terminal of the measuring coil 2 is connected to the ground potential GND via a measuring resistor R5, R6 (series circuit composed of individual resistors R5 and R6).

In the example of FIG. 1, the switching device SW3 is also used to generate an additional (auxiliary) supply voltage Vss that is different from the supply voltages VCC1.8 and VCC5. The additional supply voltage Vss is generated starting from the supply voltage VCC5 using a voltage converter circuit, which is formed by the components SW3, R7, R8, C3, D1, D2, C4 as illustrated and which also uses the clock signal V3 for the functioning thereof.

The circuit arrangement 1 also has a PWM signal generating device 20 by means of which the PWM signal out can be generated with the duty cycle that is representative of the inductance L of the measuring coil 2 by generating the PWM signal out with correspondingly triggered PWM signal edges (see FIG. 2).

In the example illustrated in FIG. 1, as already explained with reference to FIG. 2, the rising PWM signal edges are each triggered by the value of the decreasing coil current I at the same time as the value of the falling coil current I falls below the specified trigger value TRG and the falling PWM signal edges are each triggered as soon as the value of the increasing coil current I reaches or exceeds the specified trigger threshold TRG again.

In particular, since a value is selected for the trigger threshold TRG that is well above 50% of the maximum current value Imax explained above, the rising PWM signal edges are triggered very shortly after the coil current I is switched off. The coil current I decreases exponentially very steeply in the relevant time range, so that the trigger threshold TRG is always reached very quickly, whereby a variation of the inductance L of the measuring coil 2 has only very little influence on this time span until the trigger threshold TRG is reached (deviating from the circuit example according to FIG. 1, provision could therefore also be made, for example, for the rising PWM signal edge to be coupled completely rigidly to the rising edge of the clock signal V3, that is to say each rising PWM signal edge is triggered at the same time as a respective rising edge of the clock signal V3).

In contrast, the falling PWM signal edges are triggered in a time range in which the exponentially increasing profile of the coil current I is already relatively flat, so that a significant period of time that is relatively strongly dependent on the inductance L elapses between the coil current I being switched on and the trigger threshold TRG being reached.

The PWM signal generating device 20 has a trigger specification device 22 for specifying the trigger threshold TRG and a detection and comparison device 24 for detecting a value of the coil current I and for comparing this value with the specified trigger threshold TRG.

In the example, the detection and comparison device 24 has the measuring resistor R5, R6 intended as a series circuit made of individual resistors R5 and R6, which, as can be seen in FIG. 1, is arranged in series with the measuring coil 2 for the measuring coil 2 connected to the circuit arrangement 1 and over which the coil current I is thus conducted.

Furthermore, the detection and comparison device 24 in the example comprises a comparator V1 (in this case for example an operational amplifier) for comparing a voltage dropping across the measuring resistor R5, R6 with the trigger threshold TRG specified in this example as trigger voltage VTRG. In this way, the PWM signal out is provided at the output of the comparator V1.

Here, a first (inverting) input of the comparator V1 is connected via a resistor R3 to a tap between the measuring coil 2 and the measuring resistor R5, R6 and the trigger voltage VTRG is applied to a second (non-inverting) input of the comparator V1.

The comparator V1 thus compares a voltage that varies over time at its inverting input, which is representative of the value of I and is subsequently also referred to as the first measuring voltage U1, with the trigger voltage VTRG, which is applied as the "reference voltage" at its non-inverting input. If the latter is higher than the former, the comparator V1 outputs a "high level", and otherwise a "low level".

The circuit arrangement 1 also has an evaluation device 30, schematically illustrated as a function block in FIG. 1, by means of which the PWM signal out is evaluated in order to determine the duty cycle thereof and from this the inductance L of the measuring coil 2. The information about the value of the inductance L is output by the evaluation device 30, for example in the form of a digital data signal ind(L).

A particular feature of the circuit arrangement 1 is that the PWM signal generating device 20 also has a detection and specification update device 26 that is used to effect the temperature compensation already explained above, that is to say to eliminate or at least reduce a temperature dependency of the duty cycle of the PWM signal that would otherwise result from a temperature dependency of the ohmic resistance R of the measuring coil 2 and thus distort the result of the determination relating to the inductance L.

In the example shown in FIG. 1, the detection and specification update device 26 is used to detect the steady-state maximum value Imax of the coil current I periodically after switching on but before subsequently switching off the coil current I. Depending on the value Imax detected in this way, the detection and specification update device 26 then specifies and updates the trigger threshold TRG (in this case: the trigger voltage VTRG).

In the example, the detection and specification update device 26 comprises a sample-and-hold circuit SH for sampling and holding a voltage dropping the across measuring resistor R5, R6, subsequently also referred to as second measuring voltage U2, which is proportional to and thus representative of the value of the coil current I. Particularly in connection with the measuring resistor (R5, R6), the term "voltage dropping across the measuring resistor" also includes the embodiment provided in the example shown in FIG. 1 in which the second measuring voltage U2 in the narrower sense only drops across one of the two individual resistors (R5 and R6), in this case the individual resistor R6, of the measuring resistor (R5, R6) provided as a series circuit. This measure has the advantage, for example, that appropriate dimensioning of the individual resistors R5 and R6 and sampling of the voltage U2 tapped between R5 and R6 makes it possible to scale the relevant voltage U2 (that is to say the voltage to be held by the sample-and-hold circuit SH) in a simple way. In the example, this scaling corresponds to a division of the first measuring voltage U1 in the ratio $R6/(R5+R6)$.

In the example of FIG. 1, the sample-and-hold circuit SH comprises an actuatable switching device SW2 (actuated by S2), a capacitor C2 and a voltage follower V2, which in the example is implemented by an operational amplifier that is wired accordingly.

The switching device SW2 is actuated by means of a logic gate arrangement A1 (flip-flop), A2, A3 operated by the clock signal V3 and the actuation signal S2 generated thereby in such a way that, at the time suitably defined in this way, the second measuring voltage U2 tapped between R5 and R6 is applied via the switching device SW2 to the capacitor C2, which acts as a "voltage storage unit" and which holds this voltage until the next time the switching device SW2 scans the voltage U2 at the tap between R5 and R6.

In the example shown, the sampled and held voltage U2 is then provided "at low impedance" at the output of the operational amplifier, that is to say the output of the sample-and-hold circuit SH, using the operational amplifier connected as voltage follower V2.

A further feature of the detection and specification update device 26, which can be seen in the example of FIG. 1, is that the voltage U2 (at the capacitor C2 or at the output of the voltage follower V2) held by the sample-and-hold circuit SH is not used directly as said trigger voltage VTRG (for the definition of the trigger threshold TRG), but is first converted into the trigger voltage VTRG using a resistor network, which may realize further "scaling".

In the example, as shown, the resistor network comprises a "coupling" resistor R4 and a series circuit of individual resistors R1 and R2 connected to the supply voltage VCC1.8, wherein the resistor R4 is connected between an output of the sample-and-holding circuit SH (in this case: output of the voltage follower V2) and a tap of the series circuit (between R1 and R2). The voltage provided in this way at the tap of the series circuit R1, R2 is used as the trigger voltage VTRG (and is applied to an input of the comparator V1, as already explained).

The above-mentioned scaling of the trigger voltage VTRG can advantageously be provided, for example, in such a way that at a certain ("reference") temperature, such as room temperature (for example 25° C.), the trigger voltage VTRG at the output of the voltage follower V2 is equal to the voltage resulting from the dimensioning of R1 and R2 at the center tap of the series circuit R1, R2, so that at this temperature the voltage follower V2 does not intervene in the switching process of the comparator V1.

The above-mentioned scaling of the trigger voltage VTRG by applying a voltage that is dependent on the measuring coil temperature to the reference input of the comparator V1 via the resistor network R1, R2, R4, in this case the second measuring voltage U2, is also an advantageous measure in the example shown, which can be used to set or optimize essential parameters of the desired temperature compensation.

In the example, the values of the resistors R4 as well as R5, R6 (in conjunction with the values of R1 and R2) are designed in such a way that a reduction/increase of the first measuring voltage U1 caused by a change in temperature is compensated for as accurately as possible by a subsequent reduction/increase of the reference voltage VTRG, so that the pulse width of the PWM signal out is independent of the temperature.

This pulse-like signal (PWM signal out) that is output by the detection and comparison device 24 is fed into the evaluation device 30, which finally provides the data signal ind(L) that is representative of the value of the inductance L based on the corresponding evaluation.

In the evaluation device 30, which may represent for example a functional component of a control device provided for the operation of the corresponding sensor, a so-called "capture" unit may be provided, by means of which the PWM signal out is counted in order to determine the duty cycle and thus the value of the inductance L. As an alternative, the signal out can be smoothed by means of a low-pass filter, for example, and output as an analog measurement signal and/or as a digital data signal converted by means of an A/D converter.

In the case of a determination of the inductance L in the context of the operation of a sensor, the signal resulting from the evaluation (for example data signal ind(L)) may represent the sensor signal that is representative of the sensor measured variable in question (for example position, angle, etc.).

In the following description of further embodiments, the same reference signs are used for components that have the same effect. Essentially only the differences from the embodiments already described will be discussed, and in other regards reference is explicitly made to the description of preceding exemplary embodiments.

Figure 3:
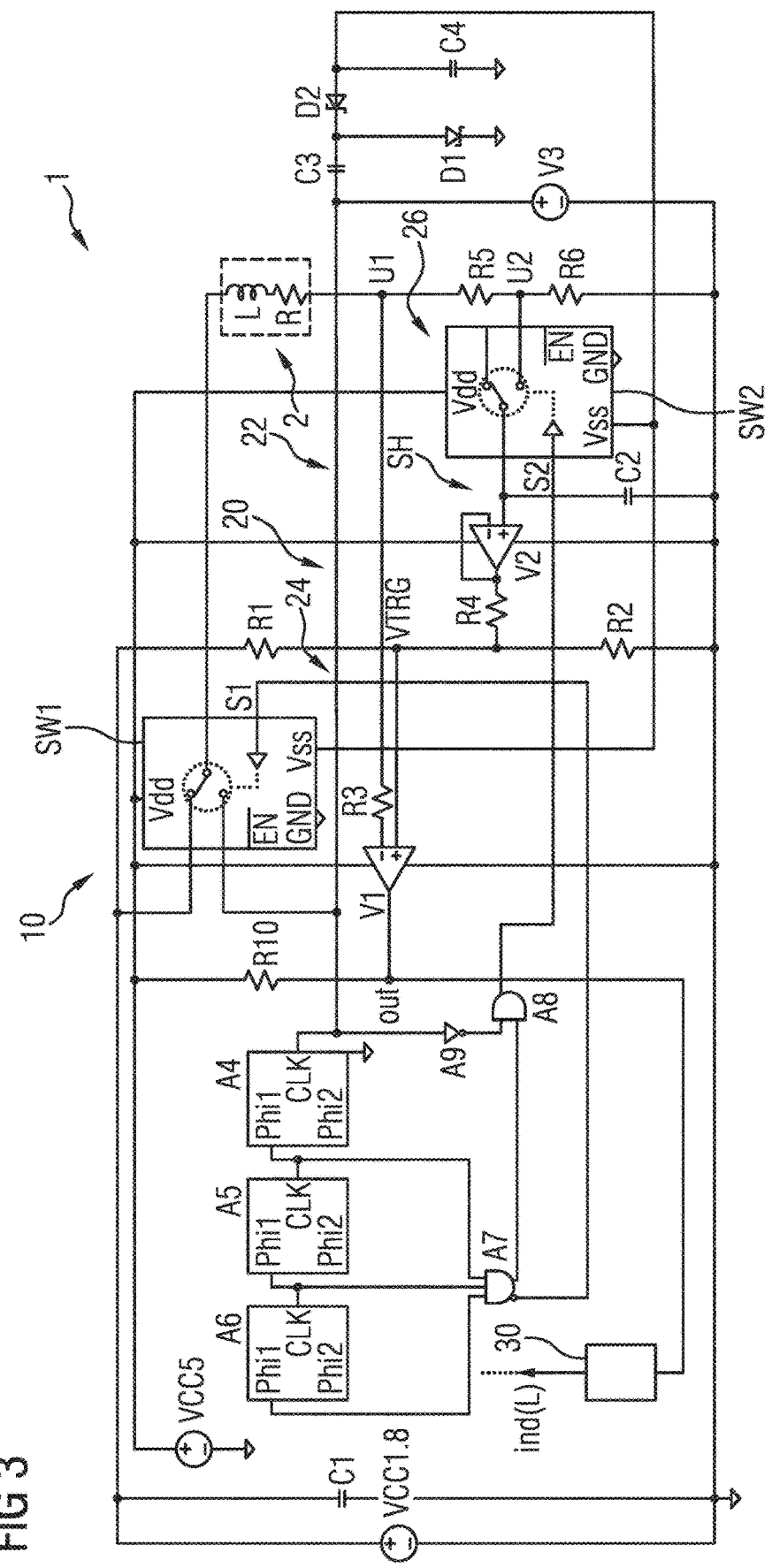
FIG. 3 shows a circuit arrangement for determining an inductance of a measuring coil incorporating teachings of the present disclosure.

FIG. 3 shows another exemplary embodiment of a circuit arrangement 1 incorporating teachings of the present disclosure for determining an inductance L of a measuring coil.

Figure 4:
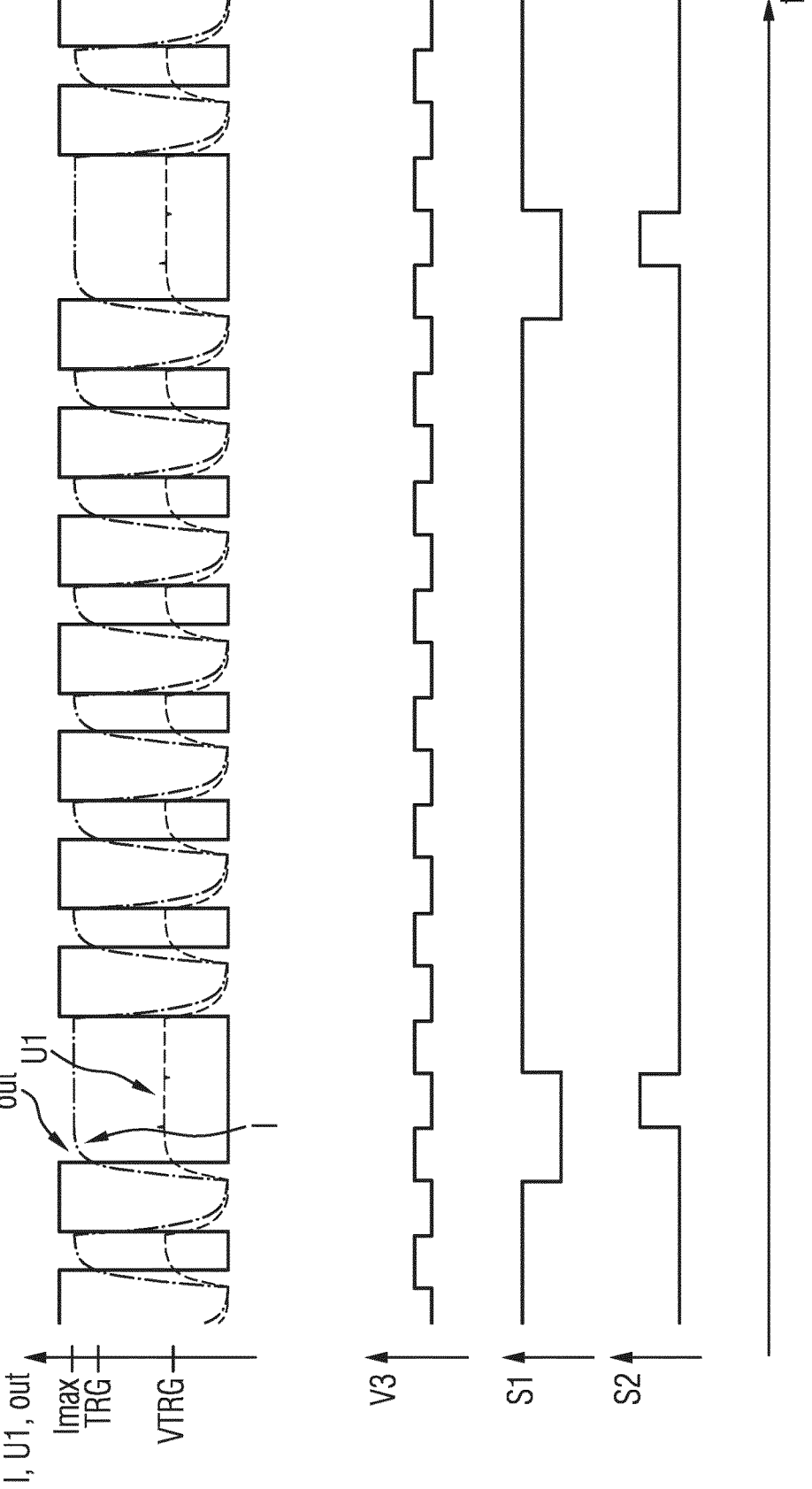
FIG. 4 shows exemplary time profiles of various current and voltage values during operation of the circuit arrangement of FIG. 3.

FIG. 4 shows, in a graph corresponding to FIG. 2, the resulting time profiles of different current and voltage values during operation of the circuit arrangement of FIG. 3.

In contrast to the exemplary embodiment of FIGS. 1 and 2 already described, the example of FIGS. 3 and 4 makes provision for the steps to compensate for the temperature dependency of the duty cycle of the PWM signal out not to be carried out after each switch-on, but only after every eighth switch-on of the coil current I. After each seven "measurement cycles" to determine the inductance L, a "temperature compensation cycle" follows to update the TRG trigger threshold.

The circuit arrangement 1 shown in FIG. 3 essentially corresponds in terms of structure and function to the embodiment of FIG. 1 that has already been described. However, a circuit-related difference that is necessary with regard to the above-mentioned functional difference regarding the execution of the temperature compensation cycles consists in the structure and thus function of a logic gate arrangement A4, A5, A6, A8, A9 of the example of FIG. 3.

Although this logic gate arrangement A4, A5, A6, A8, A9 is used for clocked actuation of the detection and specification update device 26 (here: switching device SW2 actuated by actuation signal S2) and the current feed device 10 (here: switching device SW1 actuated by actuation signal S1), this is done in such a way that, as mentioned above, the steps for temperature compensation are only carried out after every eight switch-on of the coil current I.

In this context, another difference is that, in the example of FIG. 3, the frequency of the switch-on processes (or switch-off processes) of the current feed of the measuring coil 2 during the measurement cycles is equal to the frequency of the clock signal V3.

An even further difference exists in the specific way in which the additional ("auxiliary") supply voltage Vss is generated. In the example of FIG. 3, as shown, a voltage generating circuit is formed for this purpose using the components C3, D1, D2, C4, which uses the clock signal V3 not only for a clock, but also as a "supply voltage source" for their functioning (whereas in the example of FIG. 1 a corresponding power supply is provided by means of the supply voltage VCC1.8).

What is claimed is:

1. A method for determining an inductance of a measuring coil, the method comprising:
    switching on and switching off a coil current flowing through the measuring coil at switch-on times and switch-off times that are specified by means of a clock signal;
    generating a PWM signal with a duty cycle representative of the inductance of the measuring coil by generating the PWM signal with rising and falling PWM signal edges;
    which on the one hand are triggered at the same time as the switching on or switching off of the coil current and on the other hand are triggered as soon as a value of the coil current reaches a specified trigger threshold, or
    both of which are triggered as soon as a value of the coil current reaches a specified trigger threshold;
    evaluating the PWM signal to determine the duty cycle thereof and from this the inductance of the measuring coil;
    for compensation of a temperature dependency of the duty cycle of the PWM signal due to a temperature dependency of an ohmic resistance of the measuring coil,
    detecting a steady-state maximum value of the coil current after switching on and before subsequently switching off the coil current, and
    specifying the trigger threshold depending on the detected steady-state maximum value of the coil current.

2. The method as claimed in claim 1, wherein compensating for the temperature dependency of the duty cycle is carried out after each time the coil current is switched on.

3. The method as claimed in claim 1, wherein compensating for the temperature dependency of the duty cycle is carried out after each nth time the coil current is switched on, where n is an integer in the range of 2 to 100.

4. The method as claimed in claim 1, wherein compensating for the temperature dependency of the duty cycle is commanded by a control signal as required.

5. The method as claimed in claim 1, wherein the measuring coil comprises a winding made of metallic material or by a conductor track made of metallic material on a circuit carrier board.

6. The method as claimed in claim 1, wherein the coil current is conducted via a measuring resistor arranged in series with the measuring coil and the detection of the value of the coil current includes detecting a voltage dropping across the measuring resistor.

7. A circuit arrangement for determining an inductance of a measuring coil, the arrangement comprising:

a current feed device for switching on and switching off a coil current flowing through the measuring coil at switch-on times and switch-off times that are pre-defined by means of a clock signal;

a PWM signal generating device for generating a PWM signal with a duty cycle that is representative of the inductance of the measuring coil by generating the PWM signal with rising and falling PWM signal edges;

which on the one hand are triggered at the same time as the switching on or switching off of the coil current and on the other hand are triggered as soon as a value of the coil current reaches a specified trigger threshold, or both are triggered as soon as a value of the coil current reaches a specified trigger threshold;

a trigger specification device to specify the trigger threshold;

a detection and comparison device for measuring a value of the coil current and for comparing this value with the specified trigger threshold;

an evaluating device for evaluating the PWM signal to determine the duty cycle thereof and from this the inductance of the measuring coil;

wherein, for compensation of a temperature dependency of the duty cycle of the PWM signal due to a temperature dependency of an ohmic resistance of the measuring coil, the PWM signal generating device further comprises a detection and specification update device for detecting a steady-state maximum value max of the coil current after switching on and before subsequently switching off the coil current and for specifying the trigger threshold depending on the detected steady-state maximum value of the coil current.

8. The circuit arrangement as claimed in claim 7, wherein the detection and comparison device comprises:

a measuring resistor arranged in series with the measuring coil when determining the inductance of the measuring coil and via which the coil current is conducted; and a comparator for comparing a voltage dropping across the measuring resistor with a trigger threshold specified as trigger voltage.

9. The circuit arrangement as claimed in claim 8, wherein the detection and specification update device comprises a sample-and-hold circuit for sampling and holding a voltage dropping across the measuring resistor.

* * * * *